(12) United States Patent
Murase et al.

(10) Patent No.: US 7,294,386 B2
(45) Date of Patent: Nov. 13, 2007

(54) GLASS RUN

(75) Inventors: Kazuhiro Murase, Aichi (JP); Atsushi Yatsuda, Aichi (JP); Masanori Aritake, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 40 days.

(21) Appl. No.: 10/925,985

(22) Filed: Aug. 26, 2004

(65) Prior Publication Data

US 2005/0053761 A1 Mar. 10, 2005

(30) Foreign Application Priority Data

Aug. 29, 2003 (JP) ............................ P2003-305663
Mar. 25, 2004 (JP) ............................ P2004-089327

(51) Int. Cl.
*B60J 10/04* (2006.01)

(52) U.S. Cl. ..................... 428/99; 428/120; 428/122; 428/217; 49/479.1; 49/489.1; 49/490.1; 49/440

(58) Field of Classification Search ................ 428/99, 428/120, 122, 217; 49/479.1, 489.1, 490.1, 49/440
See application file for complete search history.

(56) References Cited

U.S. PATENT DOCUMENTS 4,864,774 A 9/1989 Onishi et al.
5,655,333 A 8/1997 Yamashita
6,244,601 B1 6/2001 Buchholz et al.

FOREIGN PATENT DOCUMENTS

| EP | 1 040 950 | 10/2000 |
|---|---|---|
| JP | A-4-331628 | 11/1972 |
| JP | A-8-216694 | 8/1996 |
| JP | A-9-039579 | 2/1997 |
| JP | A-9-300979 | 11/1997 |
| JP | A-2000-103242 | 4/2000 |
| JP | A-2000-158950 | 6/2000 |
| JP | A-2000-225848 | 8/2000 |
| JP | A-2002-225569 | 8/2002 |
| JP | A-2002-337550 | 11/2002 |
| JP | A-2003-118372 | 4/2003 |

*Primary Examiner*—Alexander S. Thomas
(74) *Attorney, Agent, or Firm*—Posz Law Group, PLC

(57) ABSTRACT

A glass run has extruded portions and molded portions. The extruded portions and the molded portions are made of TPO. The glass run is attached to sashes DS. Insert members made of PP are embedded respectively in a base portion of the glass run correspondingly to a long side portion and an upper side portion of each of the molded portions. When the glass run is attached, protrusions of the insert members protruding from the base portion can engage with or stand close to edge portions of the sashes so that the protrusions can be locked with the sashes. Since the protrusions are harder than the molded portions under a relatively high temperature atmosphere, the protrusions are hardly deformed or broken even when stress caused by opening and closing of a glass is applied repeatedly to the protrusions.

9 Claims, 5 Drawing Sheets

GLASS RUN

The present application is based on Japanese Patent Applications Nos. 2003-305663 and 2004-089327, the entire contents of which are incorporated herein by reference.

BACKGROUND OF THE INVENTION

1. Field of the Invention

The present invention relates to a glass run.

2. Description of the Related Art

A glass run has a body portion and a pair of sealing lips. The body portion is constituted by a base portion and a pair of side wall portions extending from the base portion so that the body portion is substantially formed into a U-shape cross section. The sealing lips extend from nearly chip ends of the two side wall portions toward an inner side of the body portion. The body portion of the glass run is attached to sashes provided in a body or a door of a vehicle, and sealing is secured between the vehicle interior side and the vehicle exterior side of a glass by the pair of sealing lips.

Generally, the glass run is defined into extruded portions extending in the longitudinal direction and molded portions provided in corner portions. That is, each of the extruded portions is formed into a substantially linear (long) shape by an extruder. For example, each of the molded portions corresponding to a corner portion is formed by a predetermined mold so that the molded portion connects two extruded portions to each other at a predetermined angle with respect to each other.

As a material for forming the glass run, an ethylene-α-olefin-nonconjugated-diene copolymer (EPDM, hereinafter referred to as "EPDM" simply), a thermoplastic olefin-based elastomer (TPO, hereinafter referred to as "TPO" simply), etc. have been heretofore known.

Stress or moving strength may act on the glass run when the glass is opened and closed. In this event, there is a fear that the glass run may be displaced. As a technique for preventing such displacement, it is known that a movement preventing stopper is provided integrally with each corner portion, etc. The stopper is made to engage with an engagement portion of a sash so as to restrict the movement of the glass run (e.g. see Japanese Patent Publications Nos. JP 2000-158950A, JP 2000-103242A, JP 2003-118372A, H08-216694A, H09-39579A and H09-300979A).

In the aforementioned technique, there is a possibility that the stopper may be softened together with the body portion of the molded portion of the glass run in a high temperature atmosphere of about 80° C., apart from a normal temperature atmosphere. When stress is applied to the stopper under such a condition, the stopper may be broken or deviated from its engagement.

SUMMARY OF THE INVENTION

In consideration of such circumstances, an object of the invention is to provide a glass run which can be prevented from being displaced even under a high temperature atmosphere due to stress applied when a glass is opened and closed.

Various means suitable for achieving the foregoing object will be described below topically. Incidentally, an operation and an effect peculiar to corresponding means will be noted additionally if necessary.

(1) A glass run has; a body portion including a base portion and a pair of side wall portions extending from the base portion so that the body portion is substantially formed into a U-shape cross section; and a pair of sealing lips extending from nearly chip ends of the two side wall portions toward an inner side of the U-shaped body portion; wherein the body portion is attached into sashes provided in a body or a door of a vehicle, and portions of the glass run corresponding to corner portions are formed by molded portions; and wherein the glass run further has a hard member provided with an insert member which is made of a material harder than a material of each molded portion and which is embedded in at least the base portion of the molded portion, the insert member including a plate insert body, and a protrusion protruding from the insert body toward the sash side so as to be capable of being locked with or being engaged with corresponding one of the sashes.

According to the invention, the insert member is embedded in at least the base portion of the molded portion of the glass run so that the protrusion protruding from the plate insert body toward the sash side can be locked with a corresponding sash. Thus, restriction can be placed on displacement of the glass run even when stress is applied to the glass run due to opening and closing of the glass. Particularly in the invention, the aforementioned restriction can be attained more surely because the insert member is made of a material harder than that of the molded portion. Moreover, since the insert member is harder than the molded portion under a relatively high temperature atmosphere, the protrusion of the insert member is hardly deformed or broken even when the stress is applied repeatedly thereto. Thus, displacement caused by the stress when the glass is opened and closed can be prevented more reliably under a high temperature atmosphere.

(2) A glass run has: a body portion including a base portion and a pair of side wall portions extending from the base portion so that the body portion is substantially formed into a U-shape cross section; and a pair of sealing lips extending from nearly chip ends of the two side wall portions toward an inner side of the body portion; wherein the body portion is attached to sashes provided in a body or a door of a vehicle, and portions of the glass run corresponding to corner portions are formed by molded portions while the other portions of the glass run are formed by extruded portions; and wherein the glass run further has an insert member which is made of a material harder than a material of each molded portion and which is embedded in at least the base portion of the molded portion at the time of molding the molded portion, the insert member including a plate insert body, and a protrusion protruding from the insert body toward the sash side so as to be capable of being inserted into an opening (hole, recess or concave etc.) of corresponding one of the sashes or engaging with an edge of corresponding one of the sashes to be thereby locked with the sash.

According to the invention, the insert member is embedded in the molded portion at the time of molding the molded portion, so that special labor such as labor for attaching the insert member can be saved so that workability in manufacturing can be prevented from being lowered. Incidentally, the shape of the protrusion does not have to be matched with the shape of the opening of the sash accurately but may be locked with the edge portion of the opening after the protrusion has moved to some extent.

(3) In a glass run according to the invention, the insert member may be made of a material compatible with a material of the molded portion.

According to the invention, the insert member is made of a material compatible with a material of the molded portion.

Accordingly, in the molded portion, there hardly occurs a situation that the insert member is separated or detached from the material of the molded portion. Thus, a firm attachment state (embedded state) can be retained without perforating the insert body of the insert member and coupling it with the molded portion through a material the same as that of the molded portion. In order to secure a firmer embedded state, however, the insert bodies may be perforated.

(4) In a glass run according to the invention, each molded portion may be made of a TPO and each insert member is made of a polyolefin-based resin such as polypropylene or high density polyethylene.

According to the invention, as the molded portion and the insert member are compatible with each other, predetermined elasticity can be secured in the molded portion so that the function of a glass run can be exerted satisfactorily.

(5) In a glass run according to the invention, a plurality of insert members in place of the insert member are embedded in each of the molded portions, and a protrusion of one of the insert members is different in protruding direction from that of another.

According to the invention, displacement of the glass run can be restricted more reliably even when stress is applied to the glass run in a plurality of directions. When the insert members are embedded in the molded portion at the time of molding the molded portion, the aforementioned operation and effect can be obtained without requiring much labor.

(6) In a glass run according to the invention, each insert member is harder than each molded portion under a high temperature atmosphere of 80° C.

In order to obtain the operation and effect more reliably, it is preferable that the insert member is harder than the molded portion under a high temperature atmosphere of 80° C.

(7) A glass run has: a body portion including a base portion and a pair of side wall portions extending from the base portion so that the body portion is substantially formed into a U-shape cross section; and a pair of sealing lips extending from nearly chip ends of the two side wall portions toward an inner side of the body portion; wherein the body portion is attached to sashes provided in a body or a door of a vehicle, and portions of the glass run corresponding to corner portions are formed by molded portions; and wherein the glass run further has a hard member which is provided in at least the base portion of each of the molded portions and which is made of a material harder than a material of the molded portion, the hard member including a protrusion protruding toward the sash side so as to be capable of being locked with corresponding one of the sashes, the hard member being higher in hardness than the molded portion under a high temperature atmosphere of 80° C.

According to the invention, the hard member is provided in at least the base portion of the molded portion of the glass run so that the protrusion of the hard member can be locked with a corresponding sash. Thus, restriction can be placed on displacement of the glass run even when stress is applied to the glass run due to opening and closing of the glass. Particularly, such restriction can be attained more surely because the hard member is made of a material harder than a material of the molded portion. The hard member is harder than the molded portion under a high temperature atmosphere of 80° C. so that the hard member is hardly deformed or broker even when the stress is applied repeatedly thereto. Thus, displacement caused by the stress when the glass is opened and closed can be prevented more reliably under a high temperature atmosphere. Not to say, the expression "the hard member including a protrusion" may imply the case in which the hard member is constituted by only a protrusion.

(8) In a glass run of the invention, most of the hard member excluding the protrusion may be embedded in the molded portion at the time of molding the molded portion, or the hard member is welded or bonded to the molded portion after the molded portion has been molded; and wherein the protrusion is inserted into an opening (hole, recess or concave etc.) of the sash or engages with an edge of the sash so to be locked with the sash.

According to the invention, most of the hard member excluding the protrusion is embedded in the molded portion at the time of molding the molded portion or the hard member is welded or bonded to the molded portion after the molded portion has been molded. Accordingly, the hard member is firmly fixed to the molded portion. Thus, a situation that the hard member is detached from the molded portion can be prevented.

(9) In a glass run according to the invention, a plurality of hard members in place of the hard member are provided in each of the molded portions, and a protrusion of one of the plurality of hard members is different in protruding direction from that of another.

According to the invention, even when stress is applied to the glass run in a plurality of directions, a situation that the glass run is displaced can be restricted more reliably.

DETAILED DESCRIPTION OF THE PREFERRED EMBODIMENTS

First Embodiment

A first embodiment will be described below with reference to the drawings.

Figure 1:
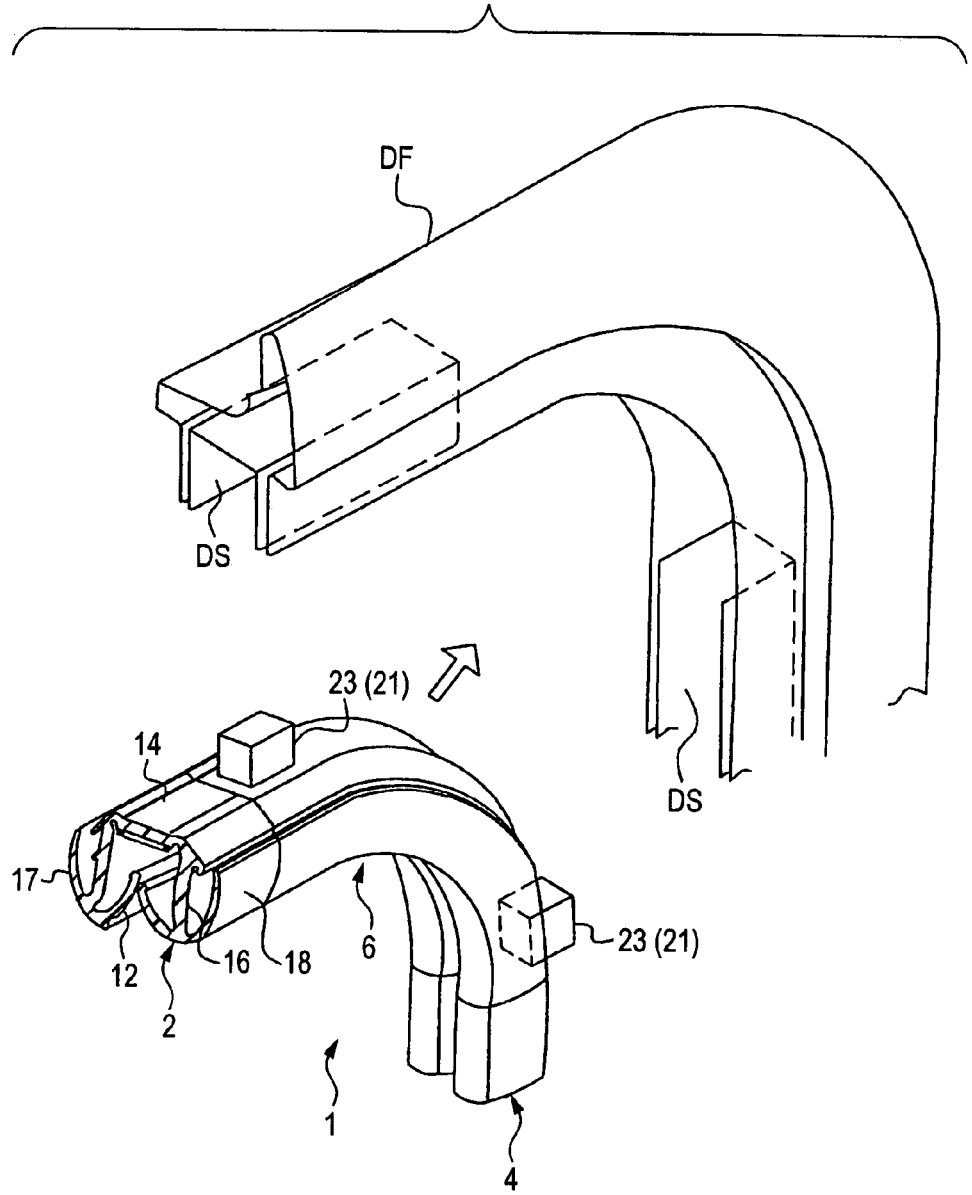
FIG. 1 is a partial perspective view showing the attachment state of a molded portion of a glass run according a first embodiment.

In a car having doors, glass runs are attached to outer circumferences of window glass opening portions of the doors correspondingly. More specifically, sashes DS are provided in each door DF so as to follow the outer circumferential shape of the door DF, and a glass run 1 according to the embodiment is attached to the inner circumferences of the sashes DS, as shown in FIG. 1.

Figure 2:
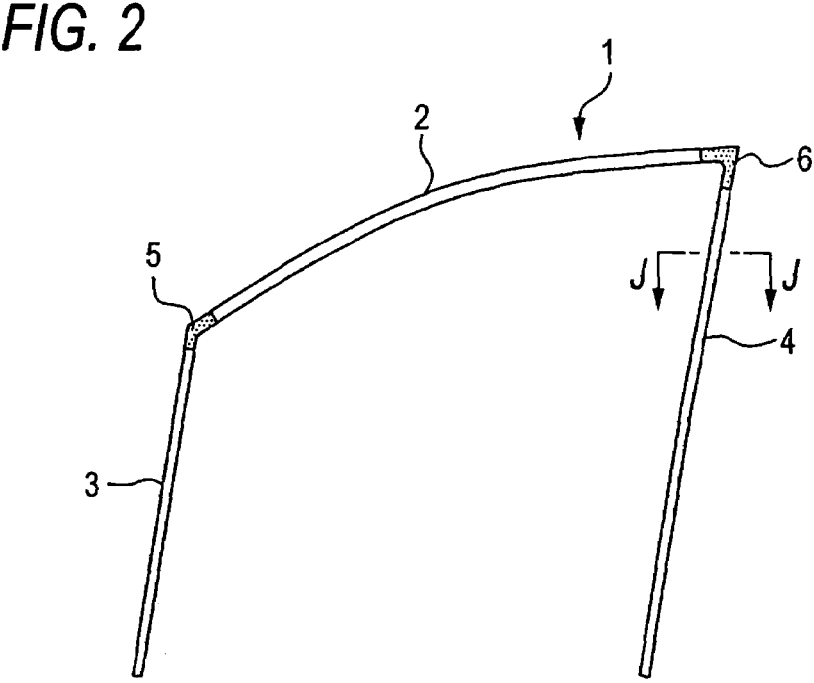
FIG. 2 is a front typical view showing the schematic configuration of the glass run.

As shown in FIG. 2, the glass run 1 is defined into an extruded portion 2 corresponding to an upper side portion in longitudinal view, extruded portions 3 and 4 corresponding to front and rear long side portions likewise respectively, and molded portions 5 and 6 (dotted portions in FIG. 2) for making a connection between end portions of the extruded portions 2 and 3 and a connection between end portions of the extruded portions 2 and 4 respectively. Each of the extruded portions 2 to 4 is formed into a substantially linear (long) shape by a not-shown extruder. Each molded portion 5, 6 is molded by a not-shown molding device so that the two extruded portions 2 and 3, 2 and 4 are connected to each other through the molded portion 5, 6 at a predetermined angle with respect to each other. The molded portions 5 and 6 according to this embodiment correspond to corner portions.

Figure 3:
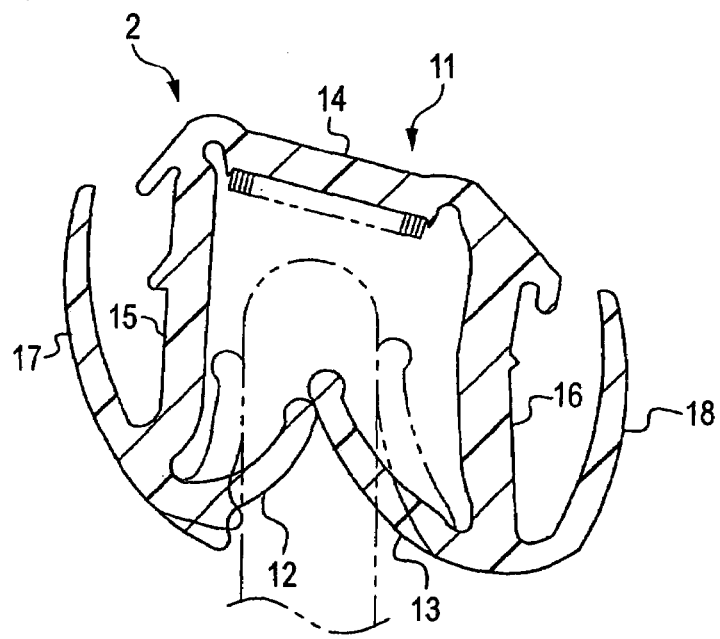
FIG. 3 is a sectional view showing an extruded portion of the glass run.
Figure 4:
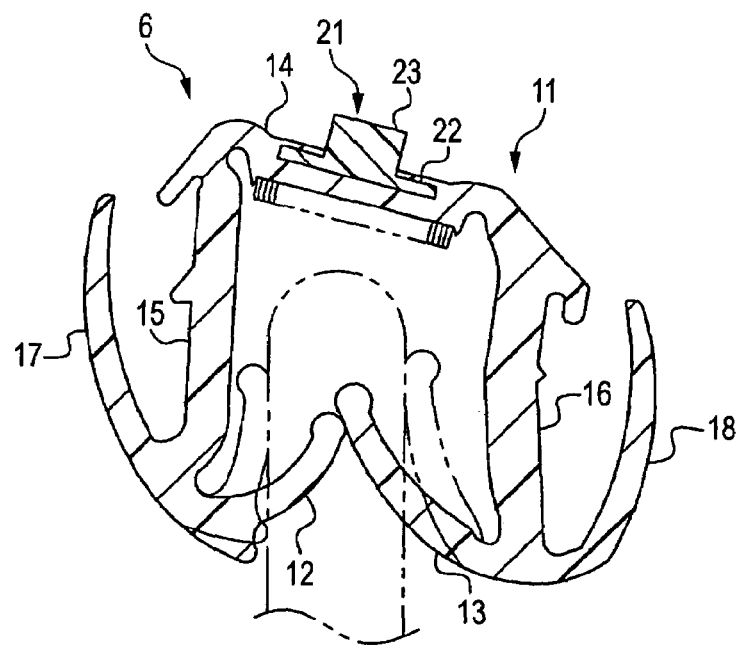
FIG. 4 is a sectional view showing the molded portion of the glass run.

FIG. 3 is a sectional view showing the extruded portion 2. FIG. 4 is a sectional view showing the molded portion 6. As shown in FIGS. 3 and 4, each of the extruded portions 2 to 4 and the molded portions 5 and 6 has a body portion 11 and a pair of sealing lips 12 and 13. The body portion 11 is constituted by a base portion 14 fitted to the sash DS, and a vehicle-exterior-side side wall portion 15 and a vehicle-interior-side side wall portion 16 both extending from the base portion 14. The sealing lips 12 and 13 respectively extend from nearly chip ends of the two side wall portions 15 and 16 toward the inner side of the body portion 11 (in the direction toward the base portion 14) so that the vehicle exterior side and the vehicle interior side of a not-shown glass are sealed by the sealing lips 12 and 13 respectively. In addition, in this embodiment, a vehicle-exterior-side design lip 17 is formed to extend from the vehicle-exterior-side side wall portion 15 toward the outside (i.e. vehicle exterior side) and a vehicle-interior-side design lip 18 is formed to extend from the vehicle-interior-side side wall portion 16 toward the outside (i.e. vehicle interior side).

In this embodiment, the extruded portions 2, 3 and 4 are made of TPO. On the other hand, the molded portions 5 and 6 are also made of TPO.

Next, characterizing portions of the embodiment will be described.

As described above, the glass run 1 is attached into the sashes DS. In the glass run 1, there are however areas where the sashes DS are absent, such as the corner portions. In other words, the corner portions of the glass run 1 can be regarded as portions where displacement occurs easily. To cope with this problem, in this embodiment, as shown in FIGS. 1 and 4, insert members 21 serving as hard members as well as insert members are embedded in the base portion 14 correspondingly to the long side portion and the upper side portion of the molded portion 6 (in FIG. 4, only the upper side portion is illustrated). Each of these insert members 21 includes a plate insert body 22, and a protrusion 23 formed integrally with the insert body 22 so as to protrude from the insert body 22 toward the sash DS (in the fitting direction). When the glass run 1 is attached, the protrusion 23 protruding from the base portion 14 can engage with or stand close to an edge portion (portion to be locked) of the sash DS so that the protrusion 23 can be locked with the sash DS. In this embodiment, the insert member 21 is made of polypropylene (PP) harder than TPO. More specifically, the hardness of TPO is 70-86° in Shore A type at normal temperature while the hardness of PP is 80° in Rockwell type at normal temperature.

The embodiment has been described with regards to the molded portion 6. Similarly, insert members 21 having protrusions 23 are provided at two places in the front molded portion 5. Each of the protrusions 23 is not always limited to the type in which the protrusion 23 is locked with an edge portion of a sash DS. That is, the protrusion 23 may be designed to be locked to be inserted (or fitted) into an opening like through hole, notch, recess, concave or the like formed in the sash DS. In this embodiment, the insert members 21 are embedded in the molded portion 5, 6 by means of so-called insert molding at the time of molding the molded portion 5, 6.

Next, the operation and effect of the embodiment configured as described above will be described.

In this embodiment, the insert members 21 are embedded in the base portion 14 of the molded portion 5, 6 of the glass run 1 so that the protrusions 23 protruding from the insert bodies 22 toward the sashes DS are locked with the sashes DS respectively. Thus, even if stress is applied to the glass run 1 due to opening and closing of the glass, restriction can be placed on displacement of the glass run 1 caused by the stress. Particularly in this embodiment, since each of the insert members 21 is made of a material (PP) harder than a material (TPO) of the molded portion 5, 6, the aforementioned restriction can be attained more surely. Also in a relatively high temperature atmosphere, each of the insert members 21 is harder than the molded portion 5, 6. Accordingly, the insert member 21 is hardly deformed or broken even when the stress is applied repeatedly thereto. Thus, displacement caused by the stress when the glass is opened and closed can be prevented more reliably under a high temperature atmosphere.

Since the insert members 21 are embedded in the molded portion 5, 6 at the time of molding the molded portion 5, 6, special labor such as labor for attaching the insert members can be saved so that workability in manufacturing can be prevented from being lowered.

Further, in this embodiment, since each of the insert members 21 is made of a material compatible with that of the molded portion 5, 6, there hardly occurs a situation that the insert member 21 is separated or detached from the molded portion 5, 6 Without perforating each insert body and coupling it with the molded portion through a material the same as that of the molded portion, a firm attachment state (embedded state) can be retained. In order to secure a firmer embedded state, however, the insert bodies 22 may be perforated.

Figure 5:
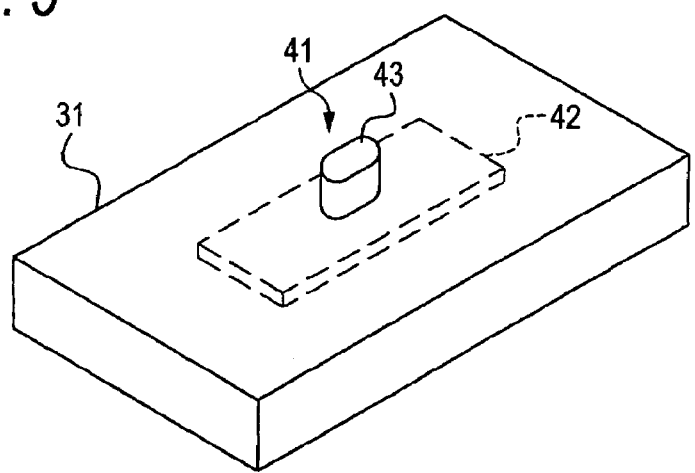
FIG. 5 is a perspective view showing a piece member for confirming an operation and an effect.
Figure 6:
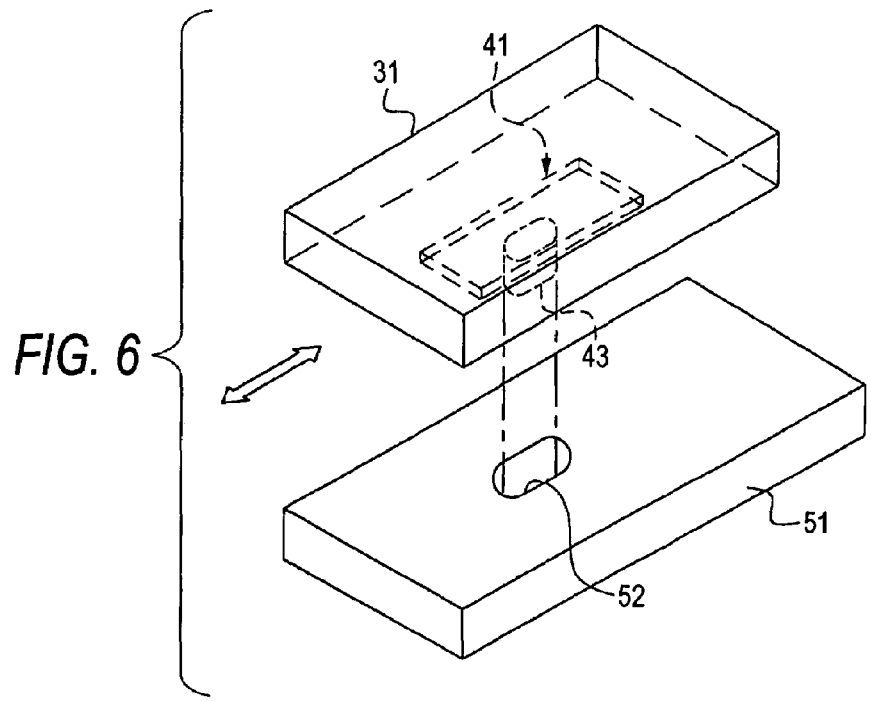
FIG. 6 is a perspective view typically showing a test system for confirming an operation and an effect.
Figure 7:
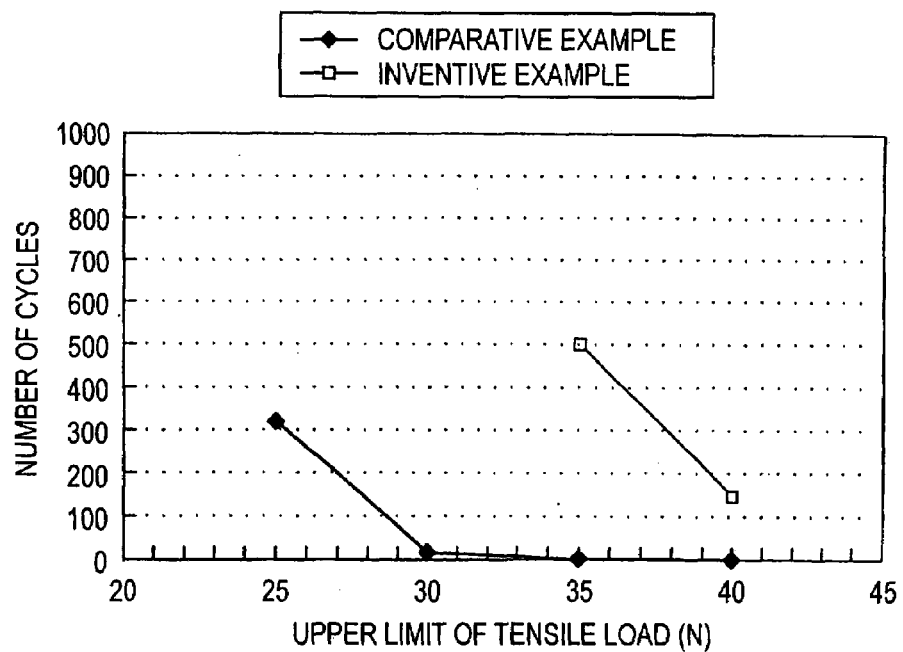
FIG. 7 is a graph showing test results indicating the relation between an upper limit of a tensile load and the number of cycles.

Next, the following test was carried out for confirming the aforementioned operation and effect. That is, as shown in FIG. 5, a plate piece member 31 molded out of TPO was regarded as a molded portion 5, 6 of the glass run 1 and an insert member 41 made of PP was embedded in the plate piece member 31 at the time of molding the plate piece member 31. The insert member 41 had an insert body 42 and a protrusion 43 in the same manner as in the embodiment. The piece member 31 was formed as a sample according to the inventive example. Another piece member made of TPO and formed integrally with a protrusion having the same shape as that of the protrusion 43 was prepared as a sample according to a comparative example. As shown in FIG. 6, each of the two piece members was held by a not-shown holding jig, and the protrusion was locked (inserted) into a long hole 52 of a metal plate 51 regarded as a corresponding sash DS. The piece member locked with the long hole 52 of the metal plate 51 was pulled and moved with a predetermined tensile load and then restored (see the arrow directions in FIG. 6). Such an operation was performed repeatedly. During the test, the ambient temperature was set at a comparatively high value, that is, 80° C. The relation of durability (number of cycles) to the tensile load in the test is shown in the graph of FIG. 7.

As is apparent from the graph, when a tensile test was performed on the sample according to the comparative example with the tensile force set at 25 (N), the protrusion was broken in about 300 cycles. When a tensile test was performed on the same with the tensile force larger than 30 (N), the protrusion was broken in one cycle or several cycles. On the other hand, it is apparent that the sample according to the inventive example could endure about 500 cycles even when a tensile test was performed on the sample with the tensile force set at 35 (N). It is also apparent that the sample according to the inventive example could endure about 150 cycles even when a tensile test was performed on the sample with the tensile force set at 40 (N). In addition, the sample according to the inventive example was broken not because the protrusion 43 was broken but because the piece member 31 per se was torn. Incidentally, though not shown in FIG. 7, the sample according to the inventive example could endure a durability test over 1,000 cycles when a tensile test was performed with the tensile force of 30 (N).

As described above, it is apparent that the glass run according to the embodiment is hardly deformed or broken even when stress is repeatedly applied to the glass run due to opening and closing of the glass in a relatively high temperature atmosphere, so that displacement of the glass run can be prevented more reliably.

Second Embodiment

Next, a second embodiment will be described with reference with FIGS. 8 and 9.

In this embodiment, an upper side portion in the front molded portion 5 will be described in detail. Also in the embodiment, the molded portion 5 is made of TPO and has a body portion 11 and a pair of not-shown sealing lips. The body portion 11 has a base portion 14 fitted into a sash, and a vehicle-exterior-side side wall portion 15 and a vehicle-interior-side side wall portion 16 both extending from the base portion 14.

Figure 8:
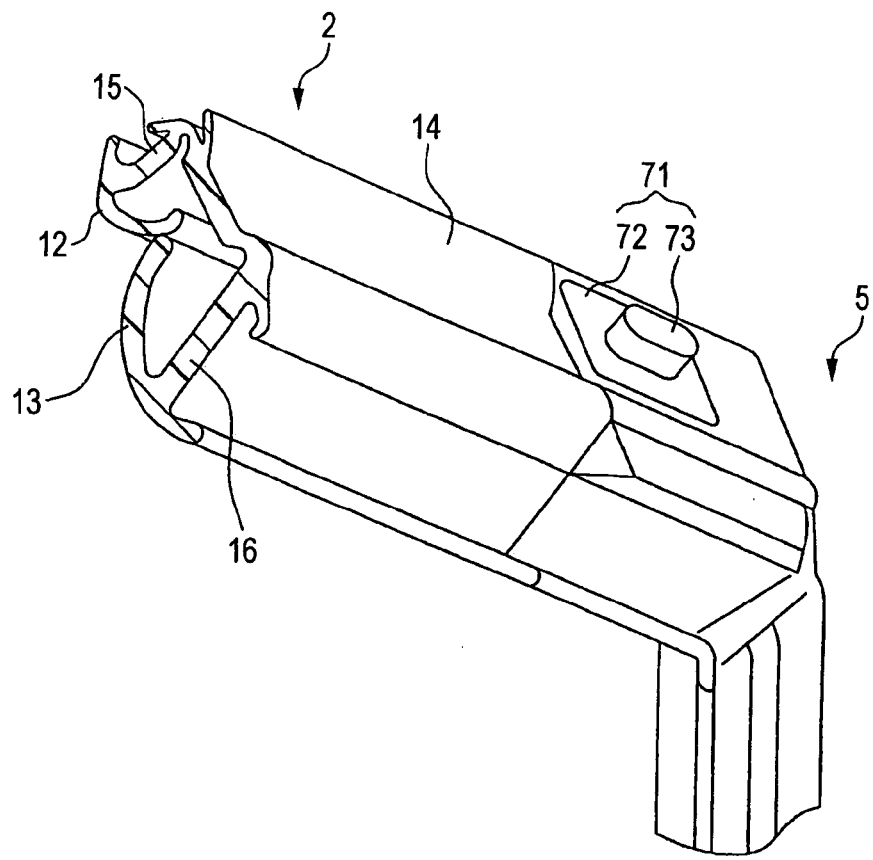
FIG. 8 is a partial perspective view showing a molded portion and so on of a glass run according to a second embodiment.
Figure 9:
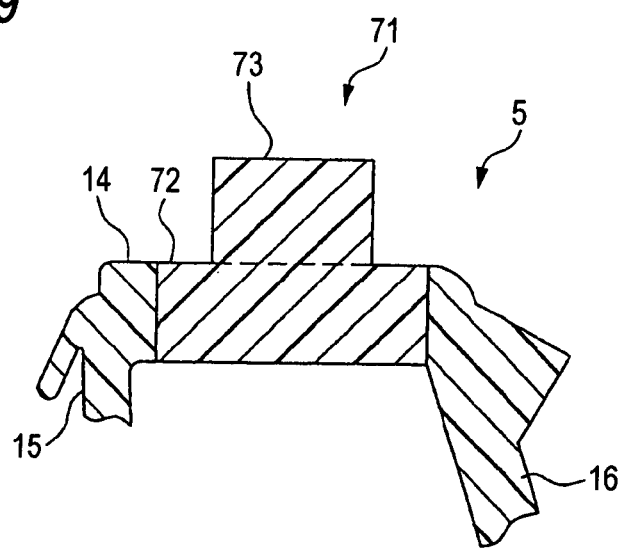
FIG. 9 is a sectional view showing the molded portion of the glass run.

In this embodiment, as shown in FIGS. 8 and 9, a hard member 71 is provided in the base portion 14 correspondingly to the upper side portion of the molded portion 5. The hard member 71 has a plate portion 72 and a protrusion 73 formed integrally with the plate portion 72 so as to protrude from the plate portion 72 toward the sash (in the fitting direction). When the glass run 1 is attached, the protrusion 73 protruding from the base portion 14 can engage with or stand close to an edge portion (portion to be locked) of the sash so that the protrusion 73 can be locked with the sash. In the embodiment, the hard member 71 is made of polypropylene (PP) harder than TPO in the same manner as the insert member 21 according to the first embodiment.

Incidentally, the protrusion 73 according to the embodiment is not always limited to the type in which the protrusion 73 is locked with the edge portion of the sash. That is, the protrusion 73 may be designed to be locked to be inserted (or fitted) into an opening like through hole, notch, recess, concave or the like formed in the sash DS.

Further, although the insert member 21 according to the first embodiment is embedded in the molded portion 5, 6 by means of so-called insert molding at the time of molding the molded portion 5, 6, the hard member 71 (particularly the plate portion 72) in this embodiment is integrated with the molded portion 5 at the time of molding the molded portion 5 so that the hard member 71 is fixedly attached to the molded portion 5. The hard member 71 according to the embodiment is different from the insert member 21 according to the first embodiment in the following point. That is, the upper surface of the plate portion 72 of the hard member 71 is exposed to the outside while the insert body 22 of the insert member 21 is completely embedded in the molded portion 5.

Incidentally, in place of the configuration in which the hard member 71 is fixedly attached to the molded portion 5 at the time of molding the molded portion 5, the hard member 71 (plate portion 72) may be joined to an attachment portion (attachment hole, attachment groove, or attachment recess) formed in the molded portion 5, by means of welding, bonding, etc. Examples of the welding include vibration welding and hot plate welding. On the other hand, "bonding" is implied specifically as a bonding with adhesive.

According to the second embodiment configured as described above, the hard member 71 is provided in the base portion 14 of the molded portion 5 of the glass run 1 so that the protrusion 73 protruding from the plate portion 72 toward the sash is locked with the sash. Thus, even if stress is applied to the glass run 1 due to opening and closing of the glass, restriction can be placed on displacement of the glass run 1 caused by the stress in the same manner as in the first embodiment. Particularly in this embodiment, since the hard member 71 is made of a material (PP) harder than a material (TPO) of the molded portion 5, the aforementioned restriction can be attained more surely. Under a relatively high temperature atmosphere, the hard member 71 is harder than the molded portion 5 so that the hard member 71 is hardly deformed or broken even when the stress is applied repeatedly thereto. Thus, displacement caused by the stress applied when the glass is opened and closed can be prevented more reliably under the high temperature atmosphere.

Incidentally, the invention is not limited to the descriptions of the embodiments but may be carried out, for example, in the following manner. It is a matter of course that other non-illustrative applications or modifications than the following examples can be made.

(a) Although the first embodiment has been described on the case where the insert members 21 are embedded at two places in each of the molded portions 5 and 6, the insert member 21 may be provided at only one place in each of the molded portions 5 and 6. Alternatively, the insert members 21 may be provided in only one of the molded portions 5 and 6. Further, the insert member may be provided integrally in an L-shape. Although the second embodiment has been described on the case where the hard member 71 is provided at one place in the front molded portion 5, the hard members 71 may be provided at two places, that is, in the long side portion and the upper side portion. The hard member 71 may be provided in the rear molded portion 6 correspondingly.

(b) Although the first embodiment has been described on the case where the protrusion 23 is shaped into a square rod, the protrusion 23 may be shaped into an oval cylinder (the same thing may be also applied to the protrusion 73 in the second embodiment). The shape of the protrusion is however not particularly limited.

(c) Although each of the embodiments has been described on the configuration where the protrusion 23 is locked with the edge of the sash DS, the protrusion may be locked to be inserted into the lock hole formed in the sash as described above. Alternatively, a plurality of protrusions may be provided.

(d) Although the two embodiments have been described on the case where the extruded portions 2 to 4 are made of TPO, the extruded portions 2 to 4 may be made of another material such as EPDM. The same thing can be also applied to the insert members. (Accordingly, the insert members may be made of another olefin-based polymer such as high density polyethylene, another resin material such as polyester or polyamide, or a metal material.) In short, the insert members may be made of a material harder than that of the molded portions.

(e) The first embodiment has been described on the case where the glass run 1 is provided with both the vehicle-exterior-side design lip 17 and the vehicle-interior-side design lip 18, the invention may be applicable to the case where at least one of the lips is omitted.

(f) An insert member (hard member) may be fitted into a groove formed in each of the extruded portions, and a coating layer made of the same material as that of each molded portion may be provided on the insert member. In short, the insert member (hard member) may be formed not only in the molded portion but also partially in the extruded portion.

(g) Lock or engagement between the protrusion and the edge may be made directly or indirectly (through a coating layer formed by coating the protrusion with the same material as that of the molded portion).

(h) Although the second embodiment has been described on the case where an attachment portion (attachment hole, attachment groove, or attachment recess) is formed in the molded portion 5 and the hard member 71 (plate portion 72) is joined to the attachment portion by welding, bonding, etc., a hard member constituted by only a protrusion may be joined to the base portion of the molded portion 5 or 6 by welding, bonding, etc.

What is claimed is:

1. A mounting structure including a glass run and a sash, the sash provided in a body or a door of a vehicle, the glass run mounted to the sash, the mounting structure comprising:
   a body portion having a substantially U-shape cross section, said body portion including a base portion and a pair of side wall portions extending from said base portion; and
   a pair of sealing lips extending from distal ends of said two side wall portions toward an inner side of said body portion;
   wherein said body portion is attachable to the sash, and a portion of said glass run corresponding to a corner is constituted by a molded portion, wherein said molded portion is connected to an extruded portion which is formed by extrusion, wherein said molded portion is made of a TPO; and
   an insert member made of a material harder than said molded portion and compatible with a material of said molded portion, said insert member being embedded in at least said base portion of said molded portion, said insert member including an insert body, and a protrusion protruding from said insert body so as to be substantially perpendicular to said insert body in said base portion of said molded portion in an outer direction toward a side of said sash, wherein said protrusion is inserted into an opening formed on said sash to be thereby locked with said sash when said glass run is attached to said sash, wherein
   said insert member is made of a polyolefin-based resin, said protrusion is brought into engagement with an edge of said opening to be thereby locked with said sash, and said insert member is harder than said molded portion under a high temperature atmosphere of 80° C.

2. A mounting structure according to claim 1, wherein a plurality of insert members are embedded in said molded portion, and the protrusions of said insert members protrude in different protruding directions.

3. A mounting structure including a glass run and a sash, the sash provided in a body or a door of a vehicle, the glass run mounted to the sash, the mounting structure comprising:
   a body portion having a substantially U-shape cross section, said body portion including a base portion and a pair of side wall portions extending from said base portion; and
   a pair of sealing lips extending from distal ends of said two side wall portions toward an inner side of said body portion;
   wherein said body portion is attachable to the sash, and a portion of said glass run corresponding to a corner is constituted by a molded portion, said molded portion being connected to an extruded portion which is formed by extrusion, said molded portion being made of a TPO; and
   a hard member made of a material harder than said molded portion and compatible with a material of said molded portion is provided in at least said base portion of said molded portion, said hard member including a fitting base portion and a protrusion protruding from said fitting base portion toward a side of said sash, said protrusion capable of being locked with said sash when said glass run is attached to said sash, wherein
   said protrusion is inserted into an opening formed on said sash to thereby be locked with said sash,
   said hard member is made of a polyolefin-based resin, said hard member being higher in hardness than said molded portion under a high temperature atmosphere of 80° C.,
   said fitting base portion of said hard member is bonded to said molded portion after said molded portion is formed,
   said protrusion is inserted into a hole or a recess of said sash and brought into engagement with an edge of said hole or recess of sash to thereby be locked with said sash, and
   said protrusion protrudes from said fitting base portion so as to be substantially perpendicular to said fitting base portion on the base portion in an outer direction toward said side of said sash.

4. A mounting structure according to claim 3, wherein most of said hard member excluding said protrusion is embedded in said molded portion when said molded portion is formed.

5. A mounting structure according to claim 3, wherein said hard member is welded to said molded portion after said molded portion is formed.

6. A mounting structure according to claim 3, wherein a plurality of hard members in place of said hard member are provided in said molded portion, and the protrusions of said hard member protrude in different protruding directions.

7. A mounting structure according to claim 3, wherein said molded portion is connected to an extruded portion which is formed by extrusion.

8. A glass run comprising:
   a body portion having a substantially U-shape cross section, said body portion including a base portion and a pair of side wall portions extending from said base portion; and a pair of sealing lips extending from distal ends of said two side wall portions toward an inner side of said body portion;

a molded portion disposed at a corner of the glass run, said molded portion being connected to an extruded portion which is formed by extrusion, said molded portion being made of a TPO; and a hard member made of a material harder than said molded portion and compatible with a material of said molded portion is provided in at least said base portion, said hard member including a fitting base portion and a protrusion protruding from said fitting base portion, wherein said hard member is made of a polyolefin-based resin, said hard member being higher in hardness than said molded portion under a high temperature atmosphere of 80° C., wherein said fitting base portion of said hard member is fitted to said molded portion, said fitting base portion is embedded in said molded portion, and said protrusion protrudes from said fitting base portion so as to be substantially perpendicular to said fitting base portion on said base portion of the glass run.

9. A glass run according to claim 8, wherein said fitting base portion has a plate shape.

* * * * *